Oct. 4, 1949.　　　W. J. GOETTINGS　　　2,483,973
APPARATUS FOR WELDING THE SEAMS OF TUBULAR ARTICLES
Filed Sept. 7, 1945　　　2 Sheets-Sheet 1

WALTER J. GOETTINGS
INVENTOR

BY George A. Evans

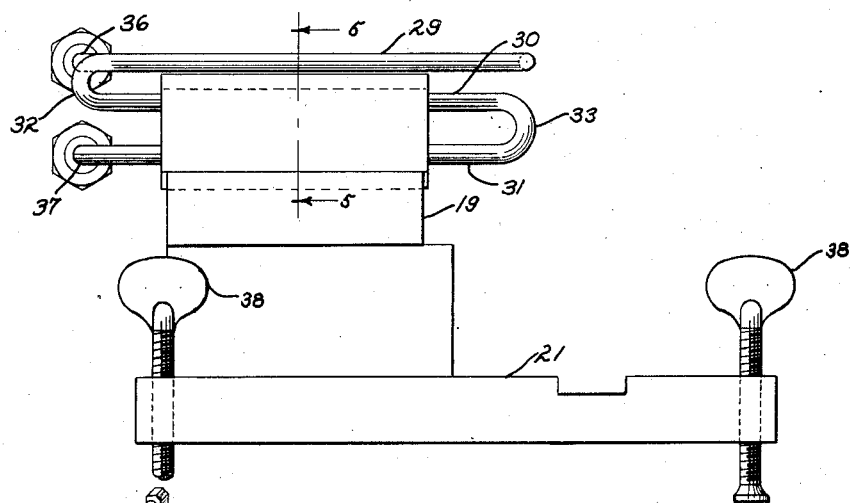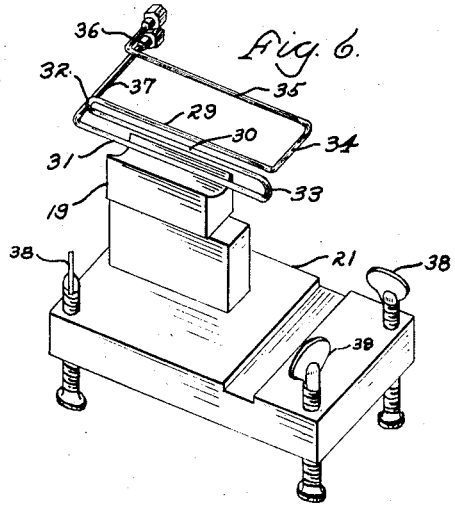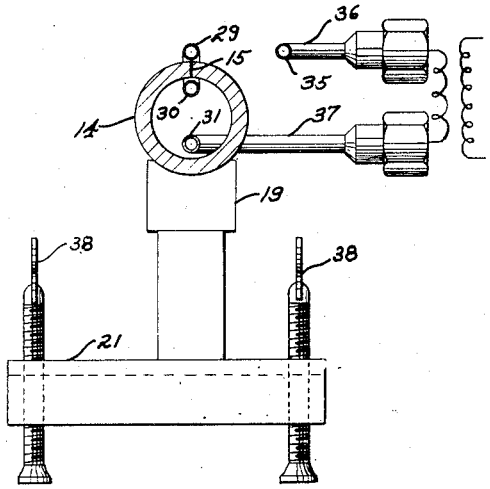

Patented Oct. 4, 1949

2,483,973

UNITED STATES PATENT OFFICE 2,483,973

APPARATUS FOR WELDING THE SEAMS OF TUBULAR ARTICLES

Walter J. Goettings, Greenfield, Wis., assignor to Chain Belt Company, Milwaukee, Wis., a corporation of Wisconsin Application September 7, 1945, Serial No. 614,872

5 Claims. (Cl. 219—13)

This invention relates to electrical apparatus for producing heat by means of induction whereby the metal adjacent the longitudinal seam of a tubular article formed from flat stock may be brought to fusion temperature or a temperature sufficient that the seam edges may be joined together. As herein disclosed there is provided a heating coil the parts of which are so shaped that the tubular body may be easily moved into the field of the coil with the longitudinal seam edges disposed in optimum position for the influence of induction heating effects when a current is impressed on the coil.

It is a primary object of the invention to provide means for welding the longitudinal seams of such bodies so that a uniformly good weld may be obtained throughout the thickness of the joint.

Another object is to produce a weld such that the article is free from stress concentrations and likewise such deformation as would be beyond the tolerances permitted in the work involved.

It is likewise an object of the invention to provide a heating coil for producing heating effects of the type mentioned in which it is possible to obtain improved coupling between the coil and the workpiece.

A further object of the invention is to provide apparatus permitting easy positioning of the workpiece in the field of the coil. This is an important factor in quantity production, as in the case of welding a great number of parts of the same dimensions and physical characteristics.

Several embodiments of the invention are illustrated in the accompanying drawings, wherein:

Figure 4 is a side elevation of a modified form of coil;

Figure 5 is an end view of the coil shown in Figure 4, with the coil and workpiece shown in section on line 5—5 of Figure 4; and Figure 6 is a perspective view of the coil shown in Figures 4 and 5.

Figure 1:
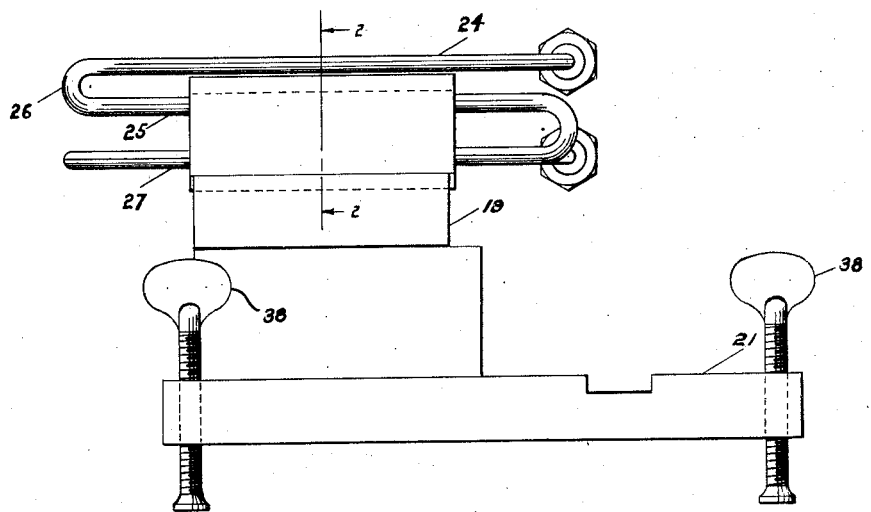
Figure 1 is a side elevation of the heating coil with a workpiece in position for welding.

The article to be welded is of tubular shape and is designated by the numeral 14. It has a longitudinal seam 15 the edges of which are brought into abutting relation prior to the introduction of the article into the coil. The actual article illustrated in the drawings is a chain bushing, the dimensions of which are shown substantially to scale in order to bring out the relative thickness of the wall sections to the length and diameter of the article.

Heat is generated in the article 14 when it is positioned in the field of the coil by reason of a high frequency current flowing through the coil, the parts of which will be described in detail hereafter. Any suitable source of current may be employed, the characteristics of which will depend upon the size, the thickness, etc., of the workpiece. The ends of the coil are provided with conventional threaded couplings permitting attachment to water conduits whereby cooling water may be circulated through the hollow coil to maintain the same in cool condition. The connections to the electrical source of energy are shown diagrammatically in Figures 3 and 5.

The invention will first be described in connection with the coil shown in Figures 1 to 3 inclusive.

Figures 2, 3:
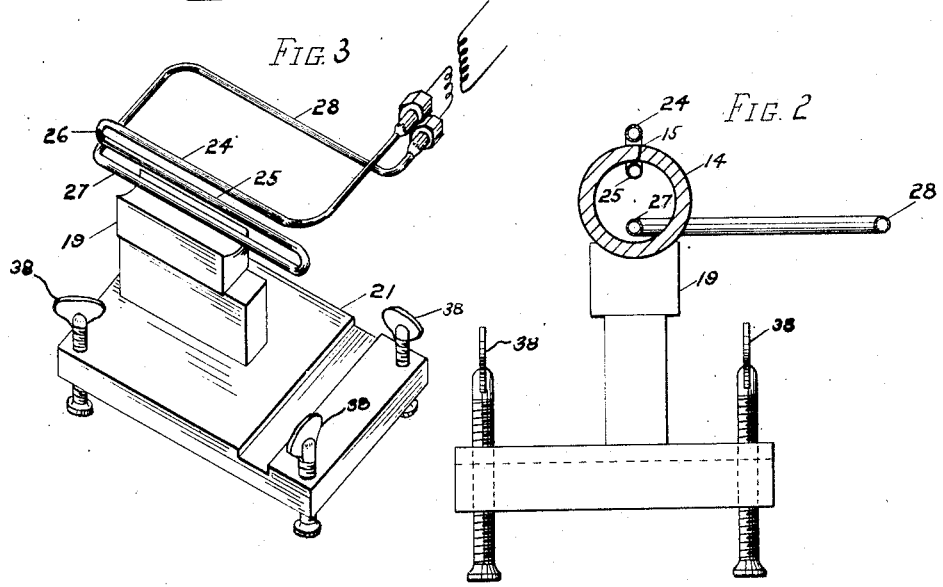
Figure 2 is an end view of the coil shown in Figure 1 with the coil and workpiece shown in section on the line 2—2 of Figure 1.
Figure 3 is a perspective view of the coil shown in Figures 1 and 2 with the workpiece removed from the coil.

During the heating operation the article is supported by a saddle 19 which rests on a base 21 so positioned with respect to the coil that the article when resting on the saddle will assume the position shown in Figures 1 and 2 of the drawings.

Referring to the coil of Figures 1 to 3, one conductor portion 24 is disposed parallel to the seam and a short distance outside it. This portion connects directly at one end to the transformer lead. A second portion 25 is also arranged parallel to the seam but inside it, the two conductors being connected in series by the loop 26 which extends around the end of the seam.

Conductor 25 is connected in series to a third conductor portion 27 which brings the current back along a path closely adjacent the inner wall of the article opposite from that of the seam. This conductor 27 connects with the other lead from the transformer and includes the conductor member 28 which is spaced a considerable distance from the conductors 24, 25, and 27, conductor 27 lying in the same horizontal plane as return conductor member 28. The terminals of the leads to the transformer are at right angles to the conductor portions 24, 25, and 27, thereby making the coil readily accessible and permitting the article to be threaded over the looped portion connecting the leg portions 25 and 27, which extend through the article.

Thus it will be seen that the heating coil comprises an S shaped portion formed by the horizontal legs 24, 25, and 27 and the turns or bends connecting them, the spacing between the leg portions permitting the article to be threaded over the legs 25 and 27 with the seam positioned between the legs 24 and 25. The exact positioning of the article with respect to the coil is highly important if a satisfactory weld is to be obtained when the current is conducted through the coil.

Unless the heating coil 24 is removed a considerable distance above the article, it will bring up the temperature of the metal adjacent to it, i. e., the metal on the outside at a faster rate than will the portion of the coil 25 which is disposed within the article on the other side of the seam. I have found that this fact can be used to advantage in obtaining a weld by adjusting the spacing of the article between the conductors 24 and 25 so that fusion will occur first at the outside edges of the seam, and the molten metal will flow through the seam toward the inside edges before the latter becomes molten. This spacing may be regulated in order that the molten metal progressing from the outside inwardly may in conjunction with the heat generated from conductor 25 bring the inside edges to fusion temperature before the metal has had a chance to run away either through the seam or by excessive melting of the outside metal. By interrupting the current just when fusion of the inside edges occur, a homogeneous weld is obtained throughout the thickness of the seam and the article will not be deformed in an undue manner.

With the coil shown in Figures 1 to 3 inclusive, some heat will be generated in that portion of the wall of the body which lies between the portions 27 and 28 of the coil and to balance this effect, the article is slightly oriented on its supporting saddle 19 so as to dispose the seam 15 on the side closest to the coil portion 28, as clearly shown in Figure 2. Conductors 24 and 25 will still heat both edges of the seam but will heat slightly more the edge on the left as shown in said figure, and this heat plus the heat generated by the coil portion formed by the parts 27 and 28 makes uniform the heating of the two abutting edges of the seam.

To avoid the necessity of orienting the article as described in the preceding paragraph, the coil may be modified as shown in Figures 4 to 6 inclusive, and certain other benefits obtained.

The coil of Figures 4 to 6 embodies substantially the same S shaped portion as does the other coil and the horizontal leg 28, which lies above the seam, and the parallel legs 30 and 31, which are surrounded by the article, are spaced apart and arranged in substantially the same manner as corresponding leg portions of the other coil. Legs 29 and 30 are connected in series by a loop portion 32 and legs 30 and 31 by a loop portion 33, each leg portion extending well beyond the ends of the article 14 when the latter is inserted in the coil.

The return lead connecting the upper leg 29 with the current source has a looped portion 34 which merges into a horizontal portion 35, lying in approximately the same horizontal plane as the leg 29. The part 35 is bent at right angles at a point approximately opposite the loop portion 32 to provide a section 36 which carries at its terminus a coupling for the supply of water circulated through the coil. The other terminus of the coil is provided by a section 37 which is substantially parallel to the section 36 but sufficiently below it so that it may lie in the same horizontal plane as the leg 31 to which it is connected at a point approximately opposite the loop 32.

As viewed in Figure 4, the article is moved from the right over the loop portion 33, and the seam 15 is arranged between the leg portions 29 and 30 as shown in Figure 5.

The height of the stand 19 and the disposition of the leg portions 29, 30, and 31 are arranged to carry forward the procedure previously described in conjunction with the other coil, but as respects this coil, it should be pointed out that the seam may lie directly between the leg portions 29 and 30 since the return portion 35 does not produce excessive heating on the side of the seam as in the case of the other coil. This is due to the fact that no part of the article lies between part 35 and leg 29. With the second coil, the spacing of the leg portion 31 with respect to its distance from the leg portion 30 and also its distance from the inside wall of the article appears to be more critical than with the first described coil. If the leg 31 is spaced very closely adjacent the wall, the heating effects of the conductor 30 near the seam is enhanced over what it is if the leg 31 is moved a greater distance from the article.

The function of the leg 27 (Figs. 1–3) and leg 31 (Figs. 4–6), setting up flux lines in the work piece counteracting the flux lines created by the respective inductors 25 and 30, is similar to that of the apparatus disclosed in the co-pending application of my co-workers, Van Zeeland and Zimmerman, Ser. No. 606,380 filed July 21, 1945.

It has been observed that the loop portion 32 tends to heat the end of the seam when the latter is moved too close to it, but this tendency may be counteracted by bending that part of the leg 31 in the region of this end of the article to increase slightly the space between it and the inside wall compared to the space between the rest of the leg 31 and the article wall. In fact the spacing between the conductor leg 31 and the wall of the article affords a very nice adjustment for producing the desired heating effect from the leg 30 and permits the desired balance between the heating effect of leg 30 compared to that of leg 29 in the localized region of the seam.

The same stand 21 may be employed to support the article regardless of which coil is used and this stand may be provided with set screws 38 for adjusting its height from the surface on which it rests. This adjustment enables the position of the article to be adjusted with respect to the legs of the coil, the latter being supported in fixed position when the couplings at the ends of the coil are attached to permanent fixtures.

The welds produced by each coil are characterized by a slight depression or groove along the outside of the weld and by a protrusion alongside the inside edge, resulting from the flow of metal inwardly of the seam as previously described. By interrupting the current when the inside edges reach fusion temperature through induced heat and contact with the molten metal passing inwardly through the seam, the protrusion on the inside edges and the cavity formed at the outside can be restricted in extent so as to be unobjectionable from the point of view of future use of the article.

In order to permit the fused metal from the outside edges of the seam to flow between the seam toward the inside edges, it is desirable that oxidation of molten metal should not occur. To prevent oxidation, welding may be practiced while the article and the coil are in an atmosphere of inert gas, such as nitrogen, or oxygen may be excluded from the weld in other ways.

The invention having been described, what is claimed is:

1. In an inductor heating coil, a double loop portion arranged to have three parallel vertically aligned leg portions, the two uppermost leg portions of said coil being spaced closer together than the two lower leg portions, the upper leg portions being spaced apart to permit a cylindrical metal work piece to be inserted therebetween, the lower leg portion of said coil being arranged so that it is contiguous the opposite inner curved portion of said cylindrical work piece, whereby flux lines in said cylindrical work piece are counteracted enabling more rapid heating in the area between said upper legs, and leads connecting the ends of the coil portion to a current source.

2. Apparatus as set forth in claim 1, characterized by the fact that the leads to the current source include members extending at a sharp angle to the parallel legs of said double loop inductor.

3. A unitary inductor heating coil comprising a winding of two turns, said turns being arranged to have three spaced parallel leg portions consisting of two outside legs and a center leg, the space between one outside leg and the center leg being greater than the space between the other outside leg and said center leg, one outside leg and the center leg being arranged to induce a current into a metallic cylindrical workpiece inserted therebetween, while the other outside leg is arranged to extend through the workpiece to discourage the flow of flux lines to said workpiece, whereby greater heating effects are obtained in that portion of the workpiece inserted between the leg portions.

4. Apparatus for welding tubular articles having a longitudinal seam, said apparatus comprising a unitary heating coil of serpentine shape having two turns and three parallel leg portions, said coil having connections at its end to a source of high frequency oscillating current, said leg portions being in substantially parallel, vertical alignment, with the two uppermost legs closer together than the two lower legs, such spacing permitting an article to be moved with its seam arranged between the uppermost leg portions with the other leg portion extending through the article and contiguous to the wall thereof, and means for supporting the tubular article with the article so arranged with respect to the coil.

5. An electric heating apparatus comprising a unitary inductor heating coil having two turns, said turns being arranged to have three substantially vertically aligned and parallel straight leg portions, the upper parallel leg portions being spaced apart to accommodate an arcuate portion of a tubular metallic work piece, the lower leg portions being spaced apart a greater distance with the lowest leg portion arranged within and contigous to the opposite arcuate portion of said work piece, whereby flux lines created in the work piece by the inner leg portions are counteracted, with consequent faster heating of the arcuate portion between the upper legs, means for supporting the work piece out of contact with said coil so that the heating effect of the upper leg portion will be slightly greater than that of the adjacent lower leg portion, and leads connecting the ends of the coil with the current source.

WALTER J. GOETTINGS.

REFERENCES CITED

The following references are of record in the file of this patent:

UNITED STATES PATENTS

| Number | Name | Date |
|---|---|---|
| 1,809,468 | Bornand et al. | June 9, 1931 |
| 1,915,047 | Blakeslee | June 20, 1933 |
| 2,020,276 | Crawford | Nov. 5, 1935 |
| 2,024,906 | Bennett | Dec. 17, 1935 |
| 2,390,559 | Sherman | Dec. 11, 1945 |
| 2,401,899 | Bierwirth et al. | June 11, 1946 |